US012598268B2

(12) United States Patent
Wang et al.

(10) Patent No.: US 12,598,268 B2
(45) Date of Patent: Apr. 7, 2026

(54) STAGE USER REPLACEMENT TECHNIQUES FOR ONLINE VIDEO CONFERENCES

(71) Applicant: Cisco Technology, Inc., San Jose, CA (US)

(72) Inventors: Tingting Wang, Hangzhou City (CN); Shancai Xu, Hangzhou City (CN)

(73) Assignee: CISCO TECHNOLOGY, INC., San Jose, CA (US)

( * ) Notice: Subject to any disclaimer, the term of this patent is extended or adjusted under 35 U.S.C. 154(b) by 280 days.

(21) Appl. No.: 18/354,297

(22) Filed: Jul. 18, 2023

(65) Prior Publication Data

US 2025/0030567 A1     Jan. 23, 2025

(51) Int. Cl.
| | |
|---|---|
| *H04N 7/15* | (2006.01) |
| *H04L 12/18* | (2006.01) |
| *H04L 65/403* | (2022.01) |
| *H04N 7/14* | (2006.01) |

(52) U.S. Cl.
CPC ........... *H04N 7/15* (2013.01); *H04L 12/1822* (2013.01); *H04L 65/403* (2013.01); *H04N 7/147* (2013.01)

(58) Field of Classification Search
None
See application file for complete search history.

(56) References Cited

U.S. PATENT DOCUMENTS

| | | | |
|---|---|---|---|
| 8,693,648 B1 | 4/2014 | Drugge et al. | |
| 9,756,286 B1 | 9/2017 | Faulkner | |
| 11,228,625 B1 | 1/2022 | Libin | |
| 11,317,060 B1 | 4/2022 | Libin | |
| 11,509,493 B1 * | 11/2022 | Agrawal | .............. G06V 40/107 |
| 11,614,854 B1 * | 3/2023 | Fitch | ................... H04L 65/1089 |
| | | | 715/753 |
| 11,714,595 B1 | 8/2023 | Libin et al. | |
| 11,949,526 B1 * | 4/2024 | Teng | ..................... G06F 3/0481 |
| 12,088,646 B1 | 9/2024 | Libin | |
| 2009/0210789 A1 | 8/2009 | Thakkar et al. | |
| 2010/0251140 A1 | 9/2010 | Tipirneni | |
| 2011/0205333 A1 | 8/2011 | Wu et al. | |

(Continued)

OTHER PUBLICATIONS

Cisco, "What's New in Webex—Update 41.6," Webex, Cisco Collaboration Cloud, Jun. 24, 2021, 107 Pages.

*Primary Examiner* — Quoc D Tran

(74) *Attorney, Agent, or Firm* — Edell, Shapiro & Finnan, LLC

(57) ABSTRACT

Presented herein are stage user replacement techniques that can be performed to facilitate automatic stage user replacement for one or more stage users of an online video conference. In one example, a computer-implemented method is provided that may include providing, to a particular user interface of a particular participant, a management interface element that enables the particular participant to manage the at least one current stage user displayed in a stage display area for a communication session. Upon receiving at least one user interaction via the management interface element, the method may include automatically: replacing the at least one current stage user with one or more new stage users and synchronizing the stage display area of the particular user interface to be displayed on other stage display areas of other user interfaces of other participants of the session.

20 Claims, 13 Drawing Sheets

(56) References Cited

U.S. PATENT DOCUMENTS

| | | |
|---|---|---|
| 2011/0271197 A1 | 11/2011 | Jones et al. |
| 2012/0014488 A1 | 1/2012 | Liu et al. |
| 2012/0140681 A1 | 6/2012 | Kaminsky et al. |
| 2012/0166534 A1 | 6/2012 | Bentley et al. |
| 2012/0182381 A1 | 7/2012 | Abate et al. |
| 2012/0331401 A1 | 12/2012 | Tipirneni |
| 2013/0194378 A1 | 8/2013 | Brown |
| 2014/0215356 A1 | 7/2014 | Brander et al. |
| 2014/0317532 A1 | 10/2014 | Ma et al. |
| 2015/0181467 A1 | 6/2015 | Bindrim et al. |
| 2015/0280970 A1* | 10/2015 | Heda .................. H04L 12/1822 |
| | | 714/4.11 |
| 2015/0301720 A1 | 10/2015 | Gottlieb |
| 2015/0304607 A1 | 10/2015 | Bader-Natal et al. |
| 2016/0014370 A1 | 1/2016 | Xie |
| 2016/0227165 A1 | 8/2016 | Moorjani et al. |
| 2016/0255126 A1 | 9/2016 | Sarris |
| 2017/0237788 A1 | 8/2017 | Xi et al. |
| 2018/0063480 A1 | 3/2018 | Luks et al. |
| 2018/0278891 A1 | 9/2018 | Pan et al. |
| 2018/0295158 A1 | 10/2018 | Faulkner |
| 2019/0289070 A1 | 9/2019 | Gorgenyi et al. |
| 2019/0377586 A1 | 12/2019 | Faulkner et al. |
| 2020/0036941 A1 | 1/2020 | Astavans et al. |
| 2020/0099889 A1 | 3/2020 | Sugihara |
| 2020/0186887 A1 | 6/2020 | Kwon et al. |
| 2022/0013027 A1 | 1/2022 | Chasen et al. |
| 2022/0150083 A1 | 5/2022 | Faulkner |
| 2022/0334706 A1 | 10/2022 | Guo et al. |
| 2022/0394413 A1 | 12/2022 | Seipp et al. |
| 2023/0078792 A1 | 3/2023 | Swerdlow |
| 2023/0121654 A1 | 4/2023 | Tangeland et al. |
| 2025/0168211 A1* | 5/2025 | Toohey .................. G06Q 10/10 |

* cited by examiner

USER INTERFACE
(STAGE MANIPULATOR)

300A

STAGE DISPLAY AREA 202

Team 1

User X

User E

User Z

User Y

˅ Participants

Search

○ Participant 1

○ Participant 2

○ Participant 3

○ Participant 4

○ Participant 5

○ Participant 6

• • •

○ Participant N

Update Stage User(s) ▾

Video    Mute    • • •    Record

216A
INTERFACE
SUB-ELEMENT

302

ONE USER (SELECTION) INTERACTION (E.G., SINGLE
MOUSE CLICK) TO CAUSE AUTOMATIC STAGE USER
REPLACEMENT AND SYNCHRONIZATION FOR ALL
PARTICIPANTS BASED ON STAGE USER LIST 230

216
STAGE MANAGEMENT
INTERFACE ELEMENT

▾ Participants ( Search )

○ Participant 1

○ Participant 2

○ Participant 3

○ Participant 4

○ Participant 5

○ Participant 6

● ● ●

○ Participant N

User I

User K

User H

User J ( Update Stage User(s) ▾ )    ( Video ) ( Mute ) ● ● ● ( Record )

STAGE DISPLAY AREA 202

400B

Participants

Search

○ Participant 1

○ Participant 2

○ Participant 3

○ Participant 4

○ Participant 5

○ Participant 6

•••

○ Participant N

User F

Next Stage User ▼   Video   Mute   Share   Record

STAGE DISPLAY AREA 202

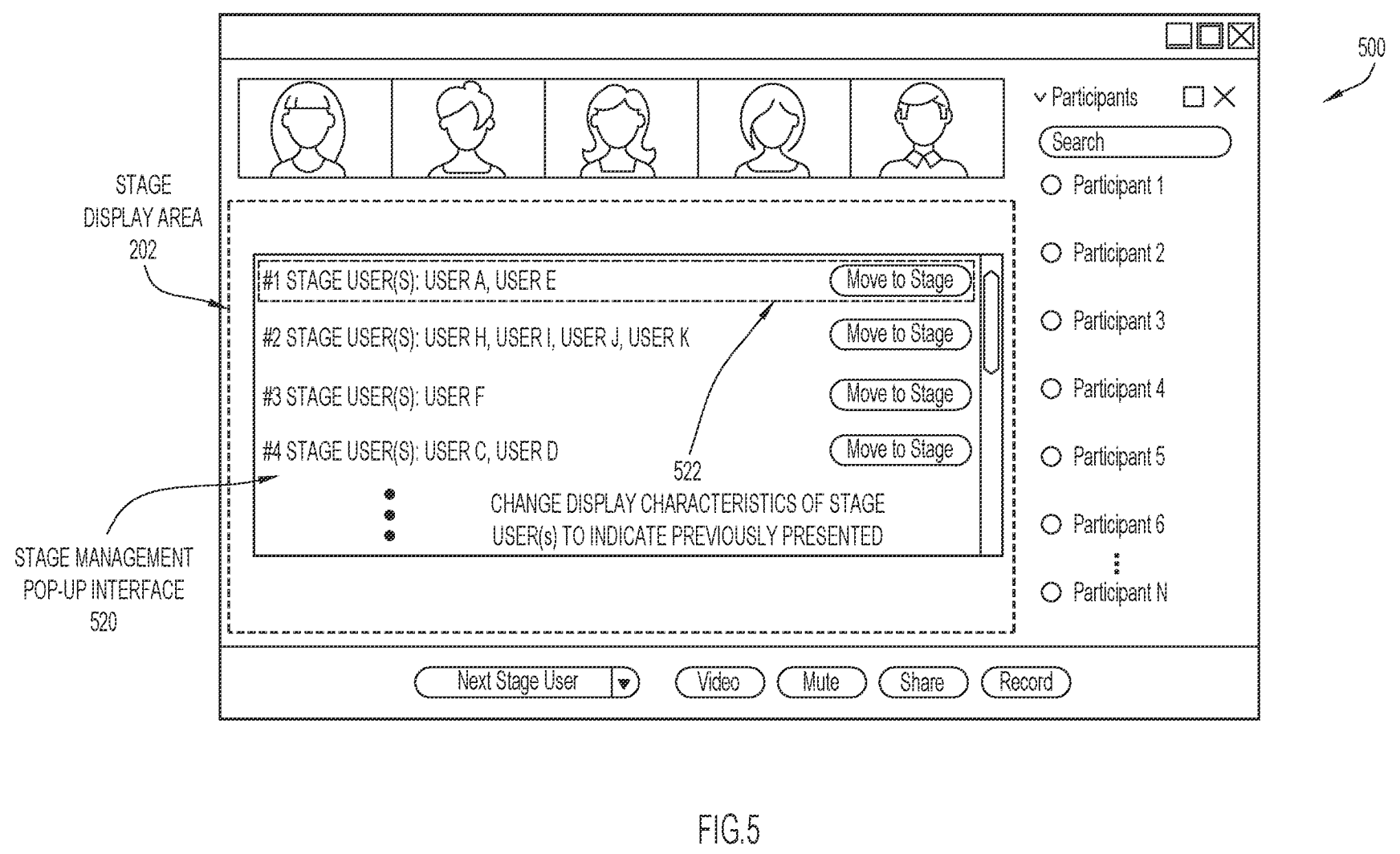

500

STAGE
DISPLAY AREA
202

STAGE MANAGEMENT
POP-UP INTERFACE
520

∨ Participants

Search

○ Participant 1

○ Participant 2

○ Participant 3

○ Participant 4

○ Participant 5

○ Participant 6

• • •

○ Participant N

Record

Share

Mute

Video

Next Stage User ▶|

1 STAGE USER(S): USER A, USER E

2 STAGE USER(S): USER H, USER I, USER J, USER K

3 STAGE USER(S): USER F

4 STAGE USER(S): USER C, USER D

• • •

522

CHANGE DISPLAY CHARACTERISTICS OF STAGE

USER(s) TO INDICATE PREVIOUSLY PRESENTED

Move to Stage

Move to Stage

Move to Stage

Move to Stage

FIG.5

STAGE USER LIST
630

632 — PERMANENT STAGE USER(s): USER A, USER B

634 — #1 STAGE USER(s): TEAM 1, USER E
2 STAGE USER(s): USER H, USER I, USER J, USER K
3 STAGE USER(s): USER F

• • •

M STAGE USER(s): USER YY

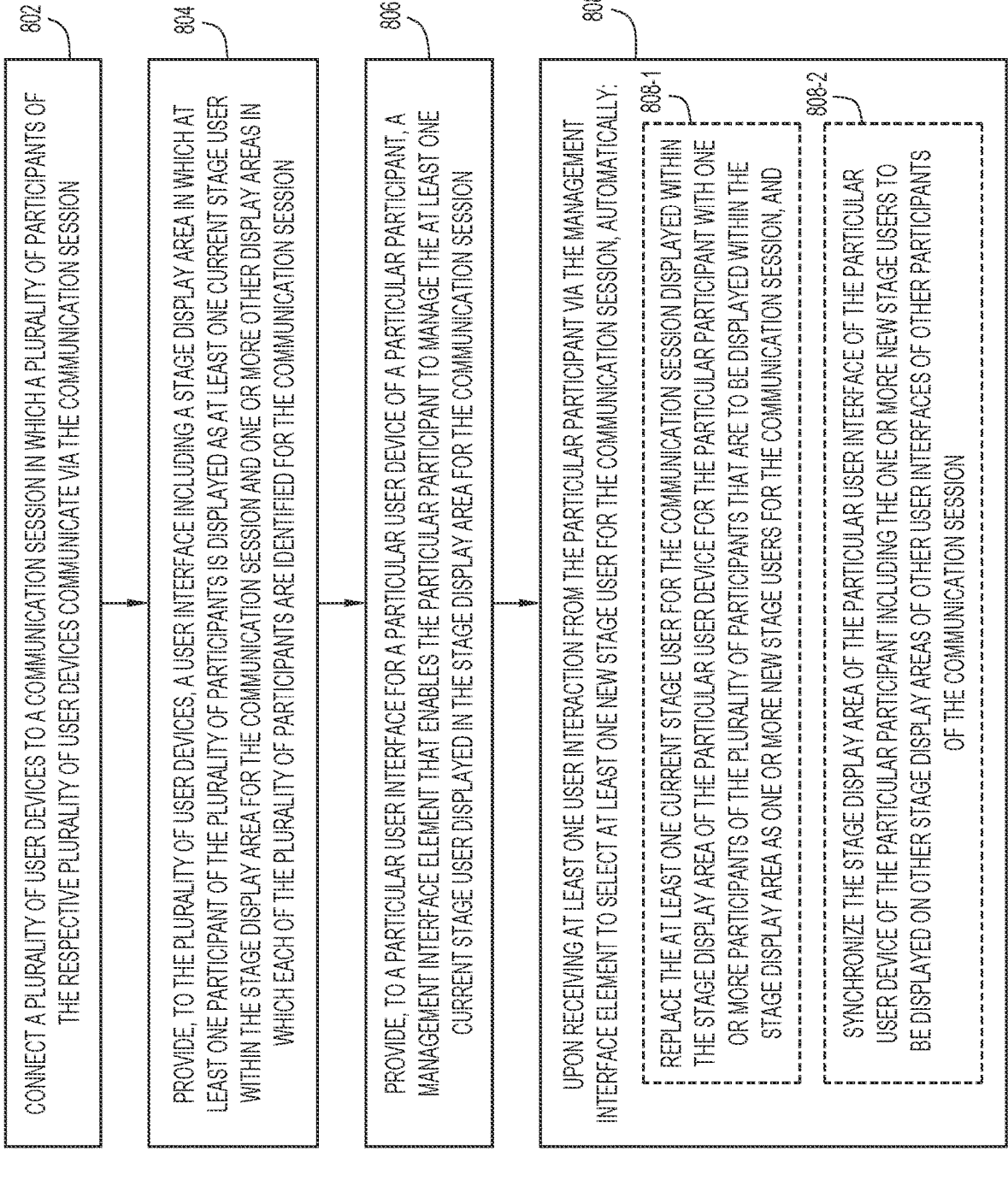

802

CONNECT A PLURALITY OF USER DEVICES TO A COMMUNICATION SESSION IN WHICH A PLURALITY OF PARTICIPANTS OF THE RESPECTIVE PLURALITY OF USER DEVICES COMMUNICATE VIA THE COMMUNICATION SESSION

804

PROVIDE, TO THE PLURALITY OF USER DEVICES, A USER INTERFACE INCLUDING A STAGE DISPLAY AREA IN WHICH AT LEAST ONE PARTICIPANT OF THE PLURALITY OF PARTICIPANTS IS DISPLAYED AS AT LEAST ONE CURRENT STAGE USER WITHIN THE STAGE DISPLAY AREA FOR THE COMMUNICATION SESSION AND ONE OR MORE OTHER DISPLAY AREAS IN WHICH EACH OF THE PLURALITY OF PARTICIPANTS ARE IDENTIFIED FOR THE COMMUNICATION SESSION

806

PROVIDE, TO A PARTICULAR USER INTERFACE FOR A PARTICULAR USER DEVICE OF A PARTICULAR PARTICIPANT, A MANAGEMENT INTERFACE ELEMENT THAT ENABLES THE PARTICULAR PARTICIPANT TO MANAGE THE AT LEAST ONE CURRENT STAGE USER DISPLAYED IN THE STAGE DISPLAY AREA FOR THE COMMUNICATION SESSION

808

UPON RECEIVING AT LEAST ONE USER INTERACTION FROM THE PARTICULAR PARTICIPANT VIA THE MANAGEMENT INTERFACE ELEMENT TO SELECT AT LEAST ONE NEW STAGE USER FOR THE COMMUNICATION SESSION, AUTOMATICALLY:

808-1

REPLACE THE AT LEAST ONE CURRENT STAGE USER FOR THE COMMUNICATION SESSION DISPLAYED WITHIN THE STAGE DISPLAY AREA OF THE PARTICULAR USER DEVICE FOR THE PARTICULAR PARTICIPANT WITH ONE OR MORE PARTICIPANTS OF THE PLURALITY OF PARTICIPANTS THAT ARE TO BE DISPLAYED WITHIN THE STAGE DISPLAY AREA AS ONE OR MORE NEW STAGE USERS FOR THE COMMUNICATION SESSION, AND 808-2

SYNCHRONIZE THE STAGE DISPLAY AREA OF THE PARTICULAR USER INTERFACE OF THE PARTICULAR USER DEVICE OF THE PARTICULAR PARTICIPANT INCLUDING THE ONE OR MORE NEW STAGE USERS TO BE DISPLAYED ON OTHER STAGE DISPLAY AREAS OF OTHER USER INTERFACES OF OTHER PARTICIPANTS OF THE COMMUNICATION SESSION

COMPUTING DEVICE

CONTROL LOGIC — 920

I/O — 916

I/O

● ● ●

NEWORK PROCESSOR UNIT(s) — 930

I/O

932

914

RF TRANSCIEVER(s) — 912

BASEBAND PROCESSOR(s) (MODEM(s)) — 910

908

STORAGE — 906

MEMORY ELEMENT(s) — 904

PROCESSOR(s) — 902

900

STAGE USER REPLACEMENT TECHNIQUES FOR ONLINE VIDEO CONFERENCES

TECHNICAL FIELD

The present disclosure relates to active online video conferences.

BACKGROUND

In online video conferences or meetings, there is typically a meeting participant leading or contributing to the discussion of the meeting within a "stage" portion of a user interface or display for the online video conference. However, there are scenarios where multiple participants, such as presenters, panelists, or simply participants of interest (POI), may need to be added into the stage portion. During an online video conference, when a current set of POI is to be changed, a meeting host or co-host has to manually change the current set of POI for the stage to another set of POI using multiple manual steps for removing presenters from the stage, adding presenters to the stage, and synchronizing the stage to be displayed among all participants for the meeting. In online video conference involving many participants, it can be challenging to manage the stage through multiple sets of POI for the online video conference.

BRIEF DESCRIPTION OF THE DRAWINGS

FIGS. 3A and 3B are diagrams illustrating example operations that can be performed via the stage management interface element of a user interface screen provided for a stage manipulator user device in order to facilitate stage user replacement for an online video conference, according to an example embodiment.

FIG. 5 is a diagram illustrating example details for a pop-up management interface that can be used to facilitate stage user replacement for an online video conference, according to an example embodiment.

FIG. 8 is a flow chart depicting a method according to an example embodiment.

DETAILED DESCRIPTION

Overview

Figure 1A:
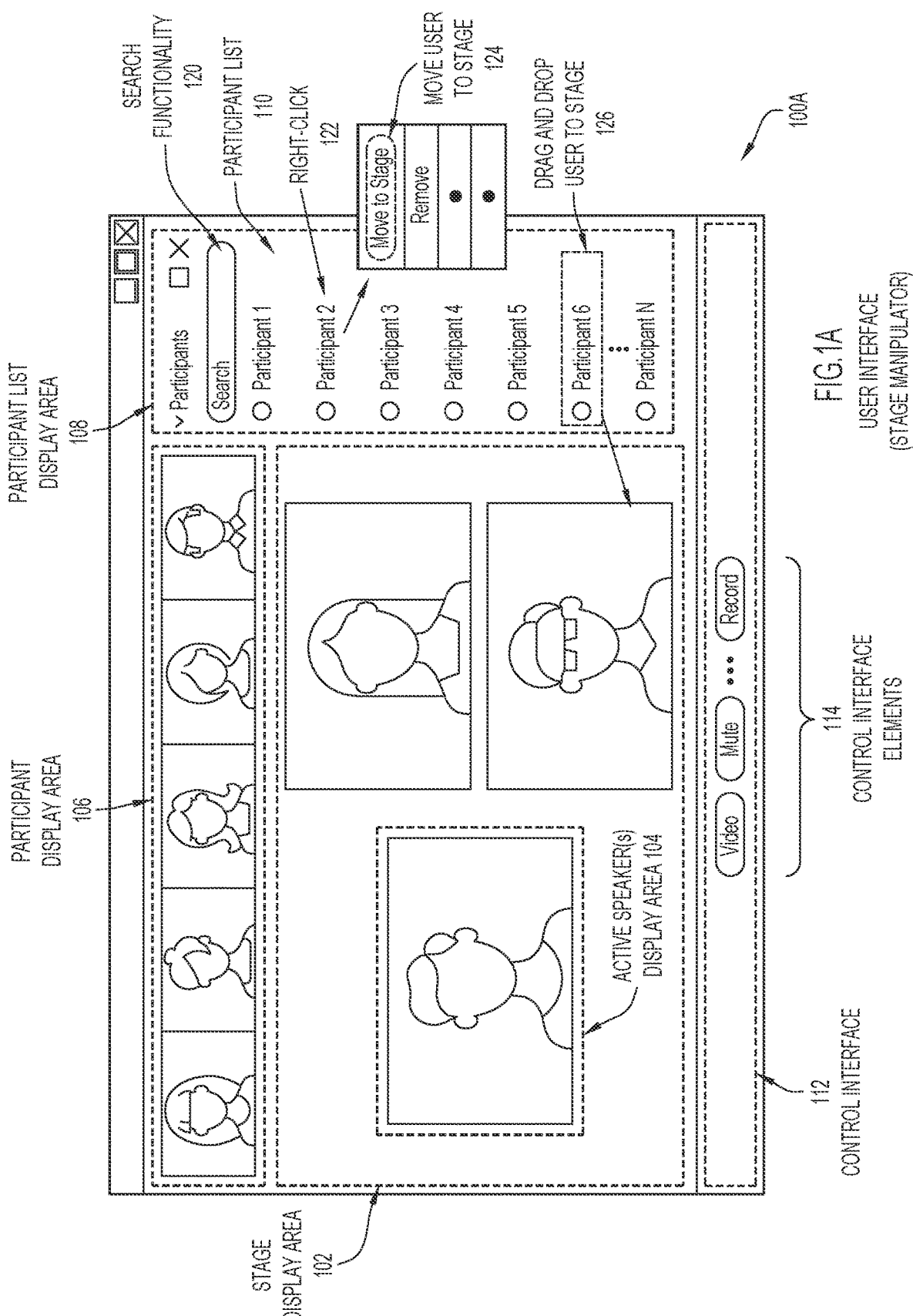
FIGS. 1A, 1B, and 1C are diagrams illustrating example details for conventional operations that can be used via various user interfaces in order to perform stage user replacement for an online video conference.

In one embodiment, a computer-implemented method is provided that may include connecting a plurality of user devices to a communication session in which a plurality of participants of the plurality of user devices communicate via the communication session; providing, for each of the plurality of user devices, a user interface including a stage display area in which at least one participant of the plurality of participants is displayed as at least one current stage user within the stage display area for the communication session and one or more other display areas in which each of the plurality of participants are identified for the communication session; providing, to a particular user interface for a particular user device of a particular participant, a management interface element that enables the particular participant to manage the at least one current stage user displayed in the stage display area for the communication session; and upon receiving at least one user interaction from the particular participant via the management interface element to select at least one new stage user for the communication session, automatically: replacing the at least one current stage user for the communication session displayed within the stage display area of the particular user interface of the particular user device for the particular participant with one or more participants of the plurality of participants that are to be displayed as one or more new stage users within the stage display area of the particular user interface of the particular user device; and synchronizing the stage display area of the particular user interface of the particular user device of the particular participant including the one or more new stage users to be displayed on other stage display areas of other user interfaces of other participants of the communication session.

Example Embodiments

In an online video conference environment (e.g., an online meeting, a graduation defense, etc.), participants and/or users (these terms are used interchangeably herein) are participating via their respective devices that may be geographically remote from each other. Each participant and the respective user (client) device, such as a computer, laptop, tablet, smart phone, etc., may collectively be referred to as meeting endpoints, endpoints, user devices, or devices. The devices may communicate with each other via one or more networks such as the Internet.

Some of the user devices may have video capabilities that can be utilized for a communication session that provides an online video conference. As referred to herein, the terms 'communication session' and 'online video conference' can be used interchangeably. Video capabilities may include, but not be limited to, a live feed of one or more participants of the communication session on a user interface screen. Other devices may not have video capabilities in the communication session and may only have audio capabilities. Further, some of the devices may have interactive connectivity to manipulate content on the user interface screen and other devices may have view-only capability to be able only to view content during the collaboration session. These are just some examples and are not provided by way of a limitation.

A participant of the online video conference/communication session may view content associated with the communication session (e.g., names and/or video streams associated with other participants, content shared from other user devices, etc.) on the participant's user device via a corresponding user interface screen provided for the device. The user device may display a number of windows, panes, or display areas, for the user interface screen in which each window/pane/display area can display various content, information, etc. associated with the communication session.

At least one such display area that may be provided for the user interface screen of participants operating user devices having video capabilities may include a "stage display area" that can be used to dynamically display content, such as one or more participants that may be considered presenters for a communication session (online video conference). Generally, the stage display area, also referred to herein as the stage, may be a display area or window that is larger than any other display area or window of a user interface screen for a participant of the communication session.

In order to manipulate the current presenters or participants displayed in the stage display area for a communication session provided for an online video conference, a host, a co-host, or other meeting administrator (e.g., a stage manipulator) of the communication session can add presenter(s) to the stage display area of their user interface screen and/or remove presenter(s) from the stage display area of their user interface screen and, once presenter(s) have been added/removed from the stage display area, the host/co-host can synchronize the stage display area as displayed on their user interface screen to also be displayed on all other participants of the communication.

However, conventional techniques for adding and/or removing presenters from the stage display area for a communication session can involve multiple manual operations.

Figure 1B:
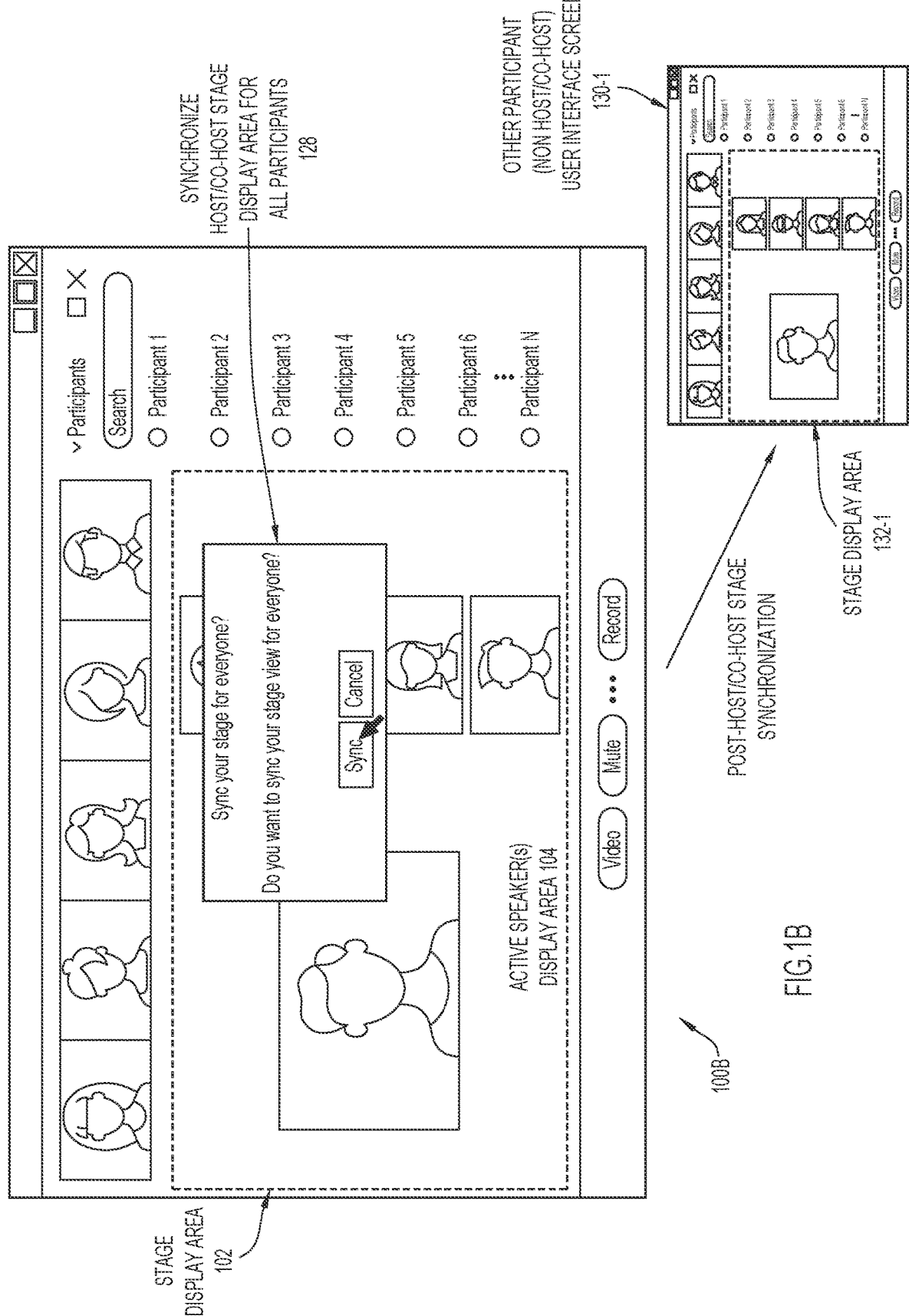
Figure 1C:
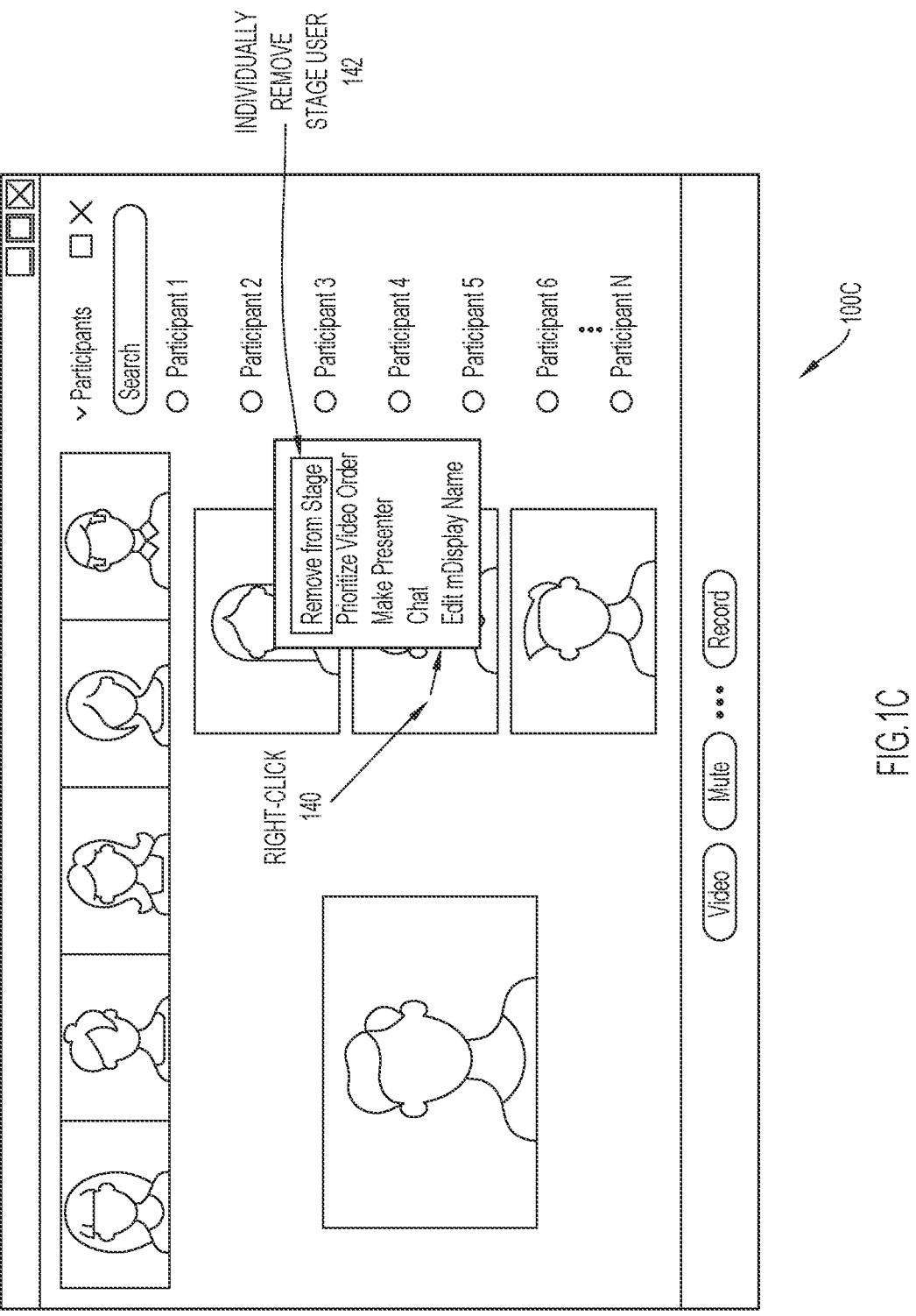

For example, with reference to FIGS. 1A, 1B, and 1C, FIGS. 1A, 1B, and 1C are diagrams illustrating example details for conventional operations involving that are conventionally used via user interfaces provided for a stage manipulator, such as a host and/or co-host of an online video conference, to perform stage user replacement for the online video conference. As shown in FIG. 1A, a user interface 100A that can be provided for a stage manipulator (e.g., host/co-host) is illustrated that can include a stage display area 102 in which "focused" content for a communication session can be displayed, such as one or more participants of the communication session that may be presenting during the session and, as such, may be considered stage users for at least a portion of the communication session. The presenters (stage users) shown in the stage display area can be displayed/shown using any display format or organization. For example, in some instances, a portion of the stage display area 102 can be utilized to display, via an active speaker(s) display area 104, one or more active speakers from among the presenters displayed in the stage display area. Determination of an active speaker from among the stage users can utilize any known techniques, such as detecting volume of a stage user, etc.

Other display areas can be provided for the user interface 100A provided for the stage manipulator, including, but not limited to, a participant display area 106 in which user icons, pictures, live video stream (sometimes referred to as 'video thumbnails'), etc. can be displayed for other participants of the communication session. Further, a participant list display area 108 can be provided that includes a participant list 110 showing the participants in a list format, along with search functionality 120 that can be used to search for participants of the communication session. A control interface area 112 can be provided that may include any number of control interface elements through which various operations can be initiated via user interaction with one or more control interface elements 114 provided for the control interface area (e.g., selecting a video interface element to activate/deactivate a video stream of a user, etc.).

Consider various conventional operations that are typically utilized by a particular participant of the communication session, such as a stage manipulator (e.g., host/co-host of the communication session), to manipulate and update or replace the current presenters (stage users) that are currently displayed via the stage display area for all participants of the communication.

For example, as shown in FIG. 1A, in some instances for a communication session involving many participants (e.g., more than 1000 or, generally, more participants than can be displayed at one time via the participant list 110 within the participant display area 108), the stage manipulator can search the name of a given participant via search functionality 120 in order to find the participant that is to be added to the stage display area 102 as a new presenter/stage user.

In one instance for adding a participant to the stage display area 102 as a new presenter/stage user, the stage manipulator can perform a right-click user interaction operation (e.g., via a mouse) on the participant's name, as generally shown at 122, to cause a pop-up menu to be displayed that includes a user interface element (e.g., button, menu selection, etc.), such as "Move to Stage" as shown in FIG. 1A, in which a selection operation, such as a left-click user interaction operation, as generally shown at 124, can be used to move the participant into the stage display area 102. In another instance, the stage manipulator can perform a selection operation, such as a drag-and-drop user interaction operation via the participants list, as generally shown at 126, or via a video thumbnail (e.g., via participant display area 106), in order to move a participant into the stage display area 102.

In order to add multiple participants into the stage display area 102, the search and selection operations have to be performed repeatedly for each participant that is to be added into the stage display area 102 as a new presenter/stage user. Moving to FIG. 1B illustrating a user interface 100B that can be provided for the stage manipulator, once the stage manipulator has manipulated the stage display area 102 to display participants that are to be presenters (stage users) for the communication session (by adding and/or removing participants from the stage display area as discussed below with reference to FIG. 1C), the stage manipulator is to then perform a synchronization operation via a synchronization interface element, as generally shown at 128, that provides for synchronizing the stage manipulator's currently displayed stage display area 102 to be shown on the other user interface screens/stage display areas of the other participants for the communication session, as generally shown for a user interface 130-1 and a synchronized stage display area 132-1 that illustrates the user interface that can be displayed for another participant of the communication session following the synchronization performed by the stage manipulator. It should be noted that only the stage display area of other participants for the communication session are synchronized, while other portions of the participants' user interfaces are not synchronized.

Moving to FIG. 1C illustrating a user interface 100C that can be provided for the stage manipulator, removing presenters (stage users) from the stage display area 102 can also involve various manual operations that are to be performed for each stage user that is to be removed from the stage display area 102. For example, in one instance the stage manipulator can perform a right-click user interaction operation (e.g., via a mouse) on a particular stage user displayed in the stage display area, as generally shown at 140, to cause a pop-up menu to be displayed that includes a user interface element (e.g., button, menu selection, etc.), such as "Remove from Stage" as shown in FIG. 1C, in which a selection operation, such as a left-click user interaction operation, as generally shown at 142, can be used to remove the stage user from the stage display area 102. In another instance, the stage manipulator can perform a drag-and-drop operation (not shown) in order to remove a participant from the stage display area 102. After all participants have been removed as current presenters from the stage display area 102, the stage manipulator can then perform another synchronization operation that provides for synchronizing the stage manipulator's currently displayed stage display area 102 to be shown on the other user interface screens/stage display areas of the other participants for the communication session, as discussed above.

In order to update the current presenters/stage users for a given communication session, multiple manual add/remove operations are often involved for a stage manipulator to manipulate their stage display area for each participant that is to be added/removed from the stage area and then a manual synchronization operation is performed by the stage manipulator to "set" all other participants' stage display area to reflect the current stage display area of the stage manipulator.

In the event of graduation defense or multi-person speech, when the presenter for a given stage display area is to change, the stage manipulator needs to remove the previous (current) presenter from the stage, find the next presenter in the potentially lengthy participants list or in video thumbnails, and then move the new presenter to the stage. For communication sessions involving many participants (e.g., 1000+ or, generally, more participants than can be displayed at one time via the participant list within the participant display area) it can be quite difficult, tedious, or otherwise time consuming for a stage manipulator to find the right person that is to be added to the stage display area, as well as to remove the current presenter/stage user from the stage display area.

In accordance with embodiments herein, unique techniques are provided that can be used to facilitate stage user replacement for an online video conference utilizing a reduced set of user interactions that may be performed by a stage manipulator (e.g., host/co-host), as compared to the conventional techniques discussed above, in order to facilitate automatically adding and/or removing one or more participants as current presenters/stage users within a stage display area of the stage manipulator's user interface screen and also automatically synchronizing the stage manipulator's stage display area to be displayed on other participants' user devices for the communication session.

Techniques as discussed for embodiments herein may be particularly useful for scenarios involving online video conferences/communication sessions that include many participants and/or may involve frequent stage user replacements throughout the online video conference/communication session. Further, techniques as presented through embodiments herein may facilitate quick and easy operations that can be performed by a stage manipulator to perform stage user replacement in a manner that is less prone to errors, as compared to the conventional operations as discussed above.

Figures 2A, 2B:
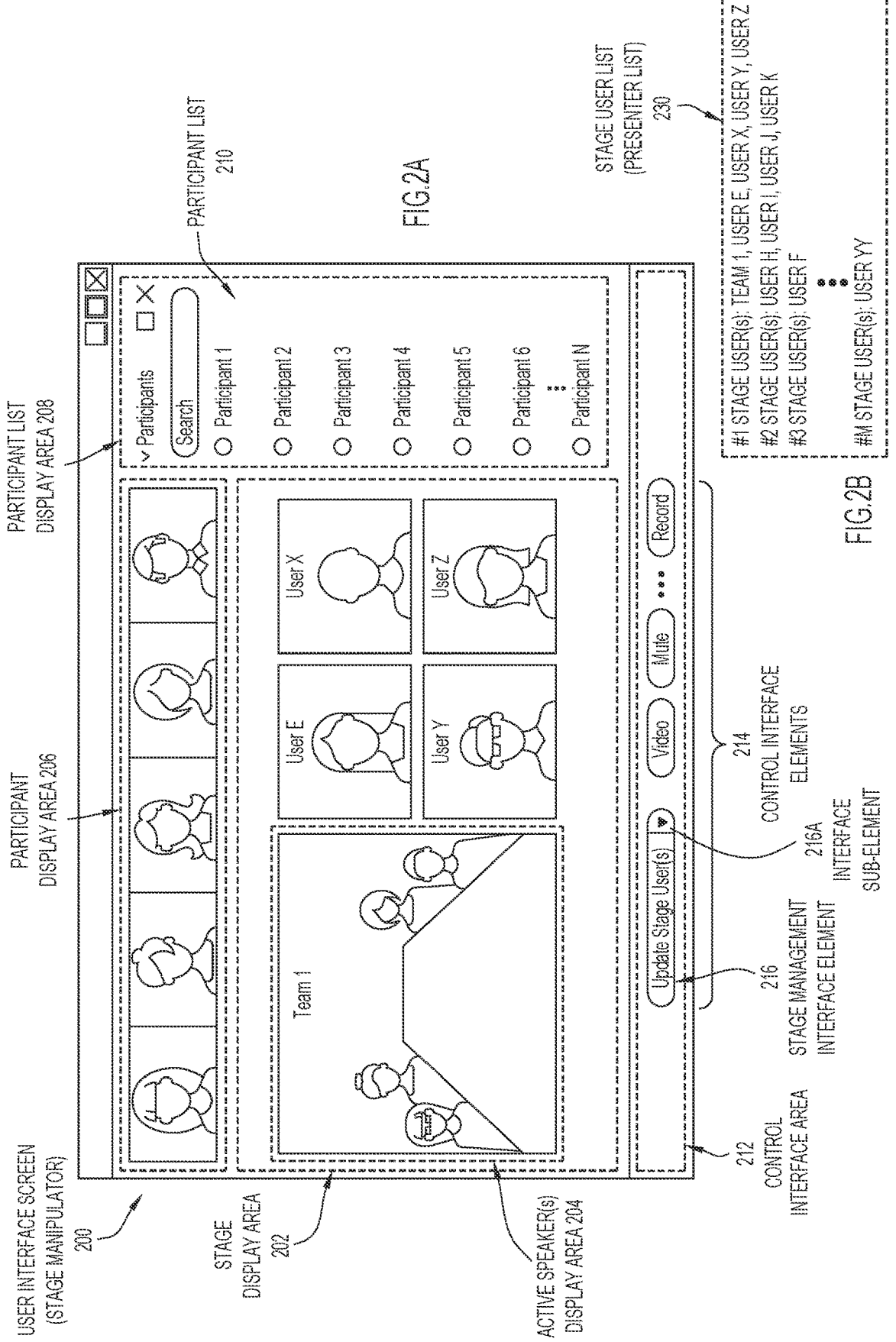
FIG. 2A is a diagram illustrating example details for a user interface screen including a stage management interface element that can be provided for a user device of a stage manipulator in order to facilitate stage user replacement for an online video conference, according to an example embodiment.
FIG. 2B is a diagram illustrating an example stage user list that can be used in combination with the stage management interface element of the user interface screen of FIG. 2A in order to facilitate stage user replacement for an online video conference, according to an example embodiment.
Figure 3B:

Referring to FIG. 2A, FIG. 2A is a diagram illustrating example details for a user interface screen 200 including a stage management interface element 216 that can be provided for a user device of a stage manipulator, such as a host and/or co-host of a communication session provided for an online video conference, in order to facilitate stage user replacement for the online video conference, according to an example embodiment. As referred to herein, a user interface can also be referred to interchangeably as a 'user interface screen'. FIG. 2B, which is discussed with reference to FIG. 2A, illustrates example details for a stage user list 230 (also referred to interchangeably herein as a presenter list) that can be utilized to facilitate stage user replacement operations in accordance with embodiments herein.

The user interface screen 200 can be provided via a video conference application configured for a user device of a participant designated as a stage manipulator for the online video conference, such that any host, co-host, and/or video conference administrator can be designated as a stage manipulator for the online video conference in which the user device and video conference application may include any logic, software, memory element(s), processor(s), and/or any other hardware, software, communication interfaces, etc. in order to provide the user interface screen 200 through which operations can be performed by the stage manipulator to facilitate stage user replacement for a stage display area 202 of the user interface screen 200, as discussed for embodiments herein.

As illustrated in FIG. 2A, the user interface screen 200 may include stage display area 202 in which one or more presenters or stage users can be displayed for the online video conference and can be synchronized to also be displayed for user interface screens of all (video capable) user devices of participants that are connected together for the online video conference, such as via a video conference server that can communicate with the user devices via one or more networks. In at least one embodiment, a portion of the stage display area 202 can be utilized to display, via an active speaker(s) display area 204, one or more active speakers from among the presenters displayed in the stage display area; however, display of active speakers is not limited to the stage display area 202 and can be identified/displayed via among other display areas of the user interface screen. Determination of an active speaker from among the presenters can utilize any combination of known techniques, such as detecting volume of a participant or stage user, activeness of a participant or stage user, etc.

Other display areas can be provided for the user interface screen 200, including, but not limited to, a participant display area 206 in which user icons, pictures, live video stream (video thumbnails), etc. can be displayed for other participants of the communication session. Further, a participant list display area 208 can be provided that includes a participant list 210 showing the participants in a list format, along with search functionality that can be used to search for participants of the online video conference.

A control interface area 212 can be provided that may include any number of control interface elements through which various operations can be initiated via user interaction with one or more control interface elements 214 provided for the control interface area (e.g., selecting a video interface element to activate/deactivate a video stream of a user, etc.).

In accordance with embodiments herein, a stage management interface element 216 can be provided for/among the control interface elements 214 through which various stage user replacement operations can be performed by the stage manipulator to update/replace stage users displayed in the stage display area 202 during the online video conference. In at least one embodiment, the stage management interface element 216 can be labeled "Update Stage User(s)" as shown in FIG. 2A, however, it is to be understood that any label may be provided for stage management interface element 216 (e.g., "Next Stage User(s)", etc.) in accordance with embodiments herein.

In at least one embodiment, stage management interface element 216 can be configured as an action or dropdown button user interface element through which one or more user interactions may be provided on/with the action or dropdown button user interface, such as through a mouse selection interaction (e.g., a left-click) or through a touch-screen interaction (e.g., a finger tap), in order to cause one or more stage user replacement operations to be performed in accordance with embodiments herein.

In at least one embodiment, an interface sub-element 216A, such as a dropdown action button user interface sub-element (e.g., a selectable/clickable down arrow button or the like), can be provided for the stage management interface element 216, which can be used to perform various stage user replacement operations, as discussed herein.

In accordance with embodiments herein, a presenter or stage user list, such as stage user list 230 shown in FIG. 2B, can be configured, or provided for the online video conference in which the stage user list 230 identifies, at least in part, an ordered list of participants of the communication session that are the to-be-on-stage participants (stage users) for the online video conference. As referred to herein and in the figures, the terms 'participants' and 'users' (e.g., stage users) can be used interchangeably and are synonymous with each other.

For example, as shown in FIG. 2B, the stage user list 230 includes an ordered list of participants of the online video conference that are to be stage users for the online video conference, starting with a first set of stage users (#1) that identifies a team (Team 1), along with a number of users (e.g., User E, User X, User Y, and User Z), that are to be displayed within the stage display area 202 at a start or the beginning of the online video conference. Next, a second set of stage users (#2) are identified, including a number of other users (e.g., User H, User I, User J, and User K) that are next to be displayed within the stage display area 202 for the online video conference. Next, a third set of stage users (#3) are identified for the stage user list 230, including a number of other users (e.g., User F) that are next to be displayed within the stage display area 202 for the online video conference. Any (M) number of stage users can be configured for a stage user list in accordance with embodiments herein; it is to be understood that the stage user list 230 shown in FIG. 2B is provided for illustrative purposes only and is not meant to limit scope of embodiments herein.

Figure 6:
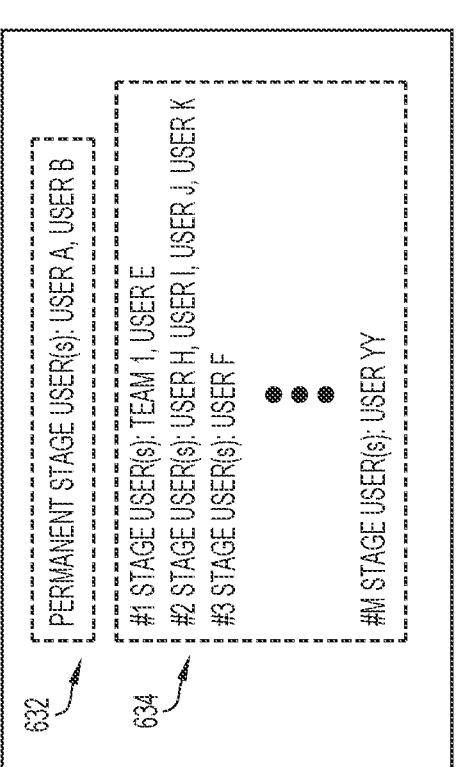
FIG. 6 is a diagram illustrating an example stage user list that can be provided for an online video conference, according to an example embodiment.

In some embodiments, as discussed in further detail herein below with regard to FIG. 6, a stage user list can be configured to identify one or more permanent stage users that are to be permanently displayed within a stage display area of an online video conference/communication session.

The stage user list 230 can be configured or provided by a stage manipulator (e.g., host, co-host, and/or meeting administrator) for the online video conference using a variety of techniques. In at least one embodiment for a scenario involving a pre-scheduled meeting, the stage user list 230 can be generated by providing any appropriate stage user/participant identifying information of the participants (in the desired order) that are to be presenters/stage users in a schedule template for the online video conference. In various embodiments, stage user/participant identifying information may include, but not be limited to, email addresses, phone numbers, usernames, aliases, room/location identifying information (e.g., for a group or team of participants that are to join the video teleconference via one or more user devices provided for a conference room), and/or the like.

In at least one embodiment, such as for a scenario involving a host/co-host initiating an on-the-fly video teleconference (e.g., for a Personal Meeting Room (PMR)), the stage user list 230 may be generated/created/provided by inviting each speaker/presenter of interest to the online video conference.

In at least one embodiment, an order of stage users provided for a particular stage user set (e.g., the order of User H, followed by User I, followed by User J, and followed by User K for the second set of stage users identified for stage user list 230) may indicate an order/organization by which the stage users are displayed within the stage display area 202 (e.g., horizontally, vertically, in rows/columns, etc.).

With reference to FIGS. 3A, 3B, 4A, and 4B, consider various stage management operations that can be performed by a stage manipulator (e.g., host and/or co-host) via various operations involving the stage management interface element 216, and potentially the interface sub-element 216A (among others), in order to facilitate stage user replacement for the stage display area 202 and synchronization with the stage display areas provided for other (video capable) user devices of other participants for the video communication session.

For example, FIG. 3A illustrates an example user interface screen 300A that can be provided via the video conference application configured for the user device of the stage manipulator (e.g., host and/or co-host) in which the user interface screen 300A includes the stage display area 202 and stage management interface element 216 configured with interface sub-element 216A, as discussed above for FIG. 2A.

In at least one embodiment, at the beginning of the online video conference, the stage display area 202 may be empty or may be occupied by the active speaker(s) stage display area 204 (e.g., in which active speakers can be auto-determined based on any combination of known active speaker resolving techniques, such as volume, activeness, etc.), and the stage manipulator may perform one user or selection interaction with/on the stage management interface element 216, such as a single mouse click selection interaction (e.g., left-click) or a single touch-screen interaction (e.g., at any time at which the stage manipulator desires), that causes the video conference application for the user device of the stage manipulator to automatically: parse the stage user list 230, determine the participants that are identified as being included within the first set of stage users (e.g., #1 stage user(s): Team 1, User E, User X. User Y, and User Z), add the first set of stage users into the stage display area of the stage display area 202, and synchronize the stage display area 202 as displayed for user interface screen 300A to be displayed within the respective stage display areas of (video capable) respective user devices of all other respective participants for the online video conference.

In at least one embodiment, if the next set of stage users (#2) as configured for the stage user list 230 comes in turn, following the first set of stage users, the stage manipulator can trigger stage user replacement for the stage display area 202 and perform automatic synchronization for the user interfaces provided for the other user devices of the other participants by performing one user (selection) interaction with/on the stage management interface element 216, such as a single (e.g., left) mouse click selection interaction or a single touch-screen interaction, as generally shown at 302 of FIG. 3A, that causes the video conference application for the user device of the stage manipulator to automatically perform stage user replacement of the first set of stage users (current presenters) displayed within the stage display area 202 for the video teleconference to be the next set of stage users (new presenters) displayed within the stage display area 202 based on the next (second) set of stage users as identified in the stage user list 230 and automatically synchronize the updated stage display area 202 to be displayed via stage display areas of user interfaces provided for the other user devices of the other participants.

For example, upon the video conference application receiving the one user (selection) interaction (302) performed by the stage manipulator via the stage management interface element 216 to select the next set of stage user(s) (new presenter(s)) for the online video conference, the video conference application is caused to automatically: parse the stage user list 230, determine the participants that are identified as being included within the next (second) set of stage users (e.g., #2 stage user(s): User H, User I, User J, and User K), remove the current set of stage users from the stage display area 202 (the #1 stage users in this example), add the second set of stage users (User H, User I, User J, and User K) into the stage display area 202 (as shown via the user interface screen 300B of FIG. 3B), and synchronize the stage display area 202 as displayed for user interface screen 300B to be displayed within the respective stage display areas of (video capable) respective user devices of all other respective participants for the online video conference.

It should be noted that the adding and removing operations can be performed in any order so long as the new stage users, along with any permanent stage users that may be configured for the video teleconference, are displayed via the stage display areas followed by the synchronization.

Thus, in at least one instance, embodiments herein may facilitate automatic stage user replacement for a stage display area provided for user interfaces of users devices of participants of an online video conference via one user interaction that can be provided by a stage manipulator for the online video conference in which the one user interaction can automatically invite/move and replace current stage users with new stage users in the stage display area of the stage manipulator and automatically synchronize the stage manipulators stage display area to be displayed for all other (video capable) user devices of other participants for the online video conference.

Assuming each set of stage user(s) is ready to present in the order identified in the stage user list 230, the stage manipulator can continue to perform the selection interaction via stage management interface element 216 to update the stage display area 206 and synchronize the stage for all other user devices of other participants for the online video conference.

However, in some instances, a next set of stage user(s) may not be ready to present and/or the order of presenters for an online video conference may need to change to an order not provided in the stage user list 230. In such instances, the stage manipulator may utilize other selection interactions via stage management interface element 216 and, in particular, via interface sub-element 216A, in order to perform stage user replacement for stage display area 202, as discussed in further detail with reference to FIGS. 4A and 4B.

Figure 4A:
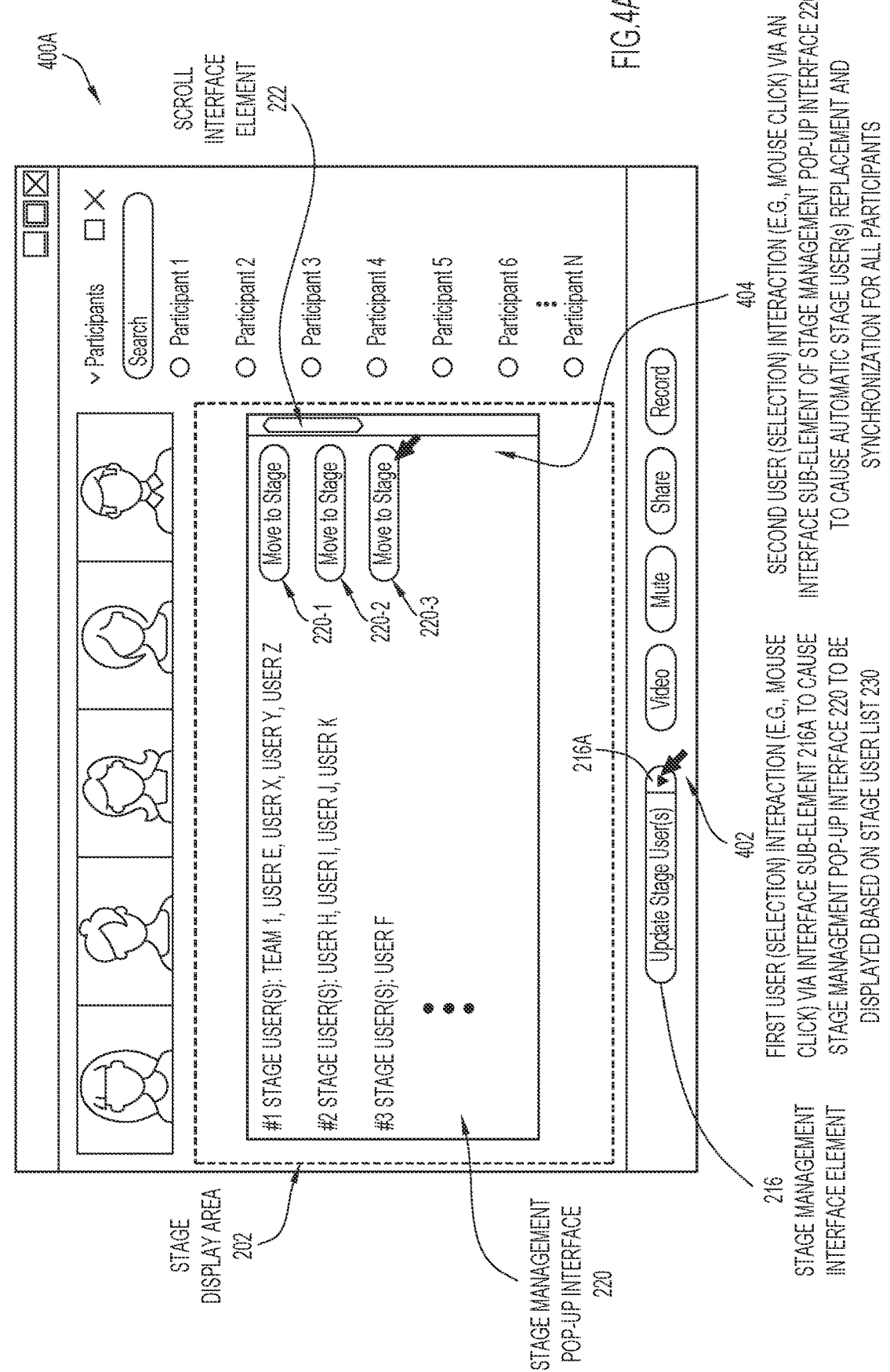
FIGS. 4A and 4B are diagrams illustrating other example operations that can be performed via the stage management interface element of a user interface provided for a stage manipulator user device in order to facilitate stage user replacement for an online video conference, according to an example embodiment.
Figure 4B:

For example, FIG. 4A illustrates an example user interface screen 400A that can be provided via the video conference application configured for the user device of the stage manipulator (e.g., host and/or co-host) in which the user interface screen 400A includes the stage display area 202 and stage management interface element 216 configured with interface sub-element 216A, as discussed above for FIG. 2A. For the example of FIG. 4A, it is assumed that the first set of stage users (#1) is currently presenting via stage display area 202.

In at least one embodiment, consider that the second set of stage user(s) (#2) as identified for the stage user list 230 are not ready to present at the conclusion of the presentation of the first set of stage users or, for some other reason, the third set of stage user(s) (#3) are to precede the second set of stage users for the online video conference such that the first set of stage users are to be replaced with the third set of stage user(s) (User F as identified in the stage user list 230) before the second set of stage user(s).

In such an embodiment, a separate control panel or stage management pop-up interface 220 can be rendered via user interface screen 400A that displays each set of stage users (#1, #2, #3) as identified for each entry of the order provided for the stage user list 230 in combination with corresponding interface sub-elements (e.g., in the same row as each set of stage user(s)), such as action button interface elements, that the stage manipulator can select via a user (selection) interaction with/on an interface sub-element for a corresponding set of stage users (e.g., mouse left-click or touch-screen interaction) that causes the video conference application for the user device of the stage manipulator to automatically move the set of stage users to the stage display area 202, remove existing/current stage users for the stage display area 202, and automatically synchronize the stage display area of the stage manipulator to be displayed for the user interfaces of the other user devices of the other participants of an online video conference.

For example, upon the video conference application receiving a first user (selection) interaction performed by the stage manipulator with/on the interface sub-element 216A, as generally shown at 402, (e.g., providing a left mouse-click or a touch-screen interaction to/on the interface sub-element 216A, such as a down-arrow action button), the video conference application is caused to display the stage management pop-up interface 220 that (in the present example) displays an interface sub-element 220-1 (e.g., an action button interface element labeled "Move to Stage") corresponding to the first set of stage users (#1) as identified in the stage user list 230, an interface sub-element 220-2 for the second set of stage users (#2) as identified in the stage user list 230, and an interface sub-element 220-3 for the third set of stage users (#3) as identified in the stage user list 230. It is to be understood that any label may be provided for interface sub-elements provided for the stage management pop-up interface 220 (e.g., "Invite to Stage", etc.) in accordance with embodiments herein.

For instances in which there are more sets of stage users configured for a stage user list than can be displayed in the display area of the stage management pop-up interface 220, a scroll interface element 222 can be provided for the interface to enable the stage manipulator to scroll/view/locate other sets of stage users for the online video conferences.

Continuing with the present example involving moving the third set of stage user(s) (User F) to the stage display area 202, upon the video conference application receiving a second user (selection) interaction performed by the stage manipulator via interface sub-element 220-3, as generally shown at 404 (e.g., providing a left mouse-click or touch-screen interaction to the interface sub-element 220-3), the video conference application is caused to automatically: remove the current set of stage users from the stage display area 202 (the #1 stage users in this example), add the third set of stage user(s) (User F) into the stage display area 202 (as shown via the user interface screen 400B of FIG. 4B), and synchronize the stage display area 202 as displayed for user interface screen 400B to be displayed within the respective stage display areas of user interfaces of (video capable) respective user devices of all other respective participants for the online video conference.

Accordingly, stage user replacement processes as provided via embodiments herein may save several stage manipulator user interactions as compared to the manual operations conventionally performed for each user that is to be added to or removed from the stage for an online video conference, such as: (1) manually removing each old/current presenter from the stage; (2) manually locating each new presenter/stage user via a video thumbnail (which may involve scrolling many pages of thumbnails) or locating each new presenter/stage user via the participant list (which may also involve scrolling up/down through many participants/manually searching the list for each new presenter/stage user); (3) manually moving each new presenter/stage user into the stage display area of the stage manipulator (via dragging and dropping or via a right-click menu) [where step (1) could potentially be repeated for as many old/current presenters that are to be removed from the stage display area and steps (2) and (3) could potentially be repeated for as many new presenters that are to be added to the stage display area], and (4) manually synchronizing the stage display area of the stage manipulator to be displayed for all other (video capable) user devices of other participants for the online video conference. Further, embodiments herein may also minimize or reduce the number of mistakes that could be caused by the repeated manual operations that are conventionally performed for manually adding/removing users from a stage.

Additional variations can be envisioned for various interface elements and/or stage user lists that may utilized to facilitate stage user replacement for online video conferences/communication sessions in accordance with various embodiments. For example, although certain user interface button types, such as dropdown, action, etc. are discussed for various example embodiments herein, it is to be understood that any user interface buttons, elements, combinations thereof and/or the like now known or hereinafter developed may be utilized to facilitate stage user replacement for online video conferences/communication sessions in accordance with various embodiments.

In at least one embodiment, additional information could be provided or rendered for a stage management pop-up interface. With reference to FIG. 5, for example, FIG. 5 is a diagram illustrating example details for a stage management pop-up interface 520 for an example user interface screen 500 that can be used to facilitate stage user replacement for an online video conference, according to an example embodiment. As shown in FIG. 5, in at least one embodiment, the stage management pop-up interface 520 can change the display characteristics (e.g., color, shading, etc.) for each set of stage user(s) that has already presented or be selected to present for the online video conference. In one example, text identifying the first set of stage users (#1), as well as text/display of the interface sub-element for the corresponding row (e.g., within dashed-line box 522) can be displayed in a different (e.g., lighter) font, shading, etc. as compared to the text/display for other sets of stage user(s) that are either currently presenting or have yet to present for the online video conference.

In at least one embodiment, as noted above, a stage user list can be configured to identify one or more permanent stage users that are to be permanently displayed within a stage display area of an online video conference/communication session. With reference to FIG. 6, FIG. 6 is a diagram illustrating example details for a stage user list 630 that can be configured for an online video conference/communication session, according to an example embodiment. As shown in FIG. 6, stage user list 630 includes an entry or field 632 identifying one or more permanent stage user(s), such as a User A and a User B that are to be permanently displayed within the stage display area for a particular online video conference. The stage user list 630 can further be configured with a number of entries or fields 634 identifying an ordered list of sets of participant(s) of the video teleconference that are to be stage users (e.g., sets of stage user(s)) during the online video teleconference.

Figure 7:
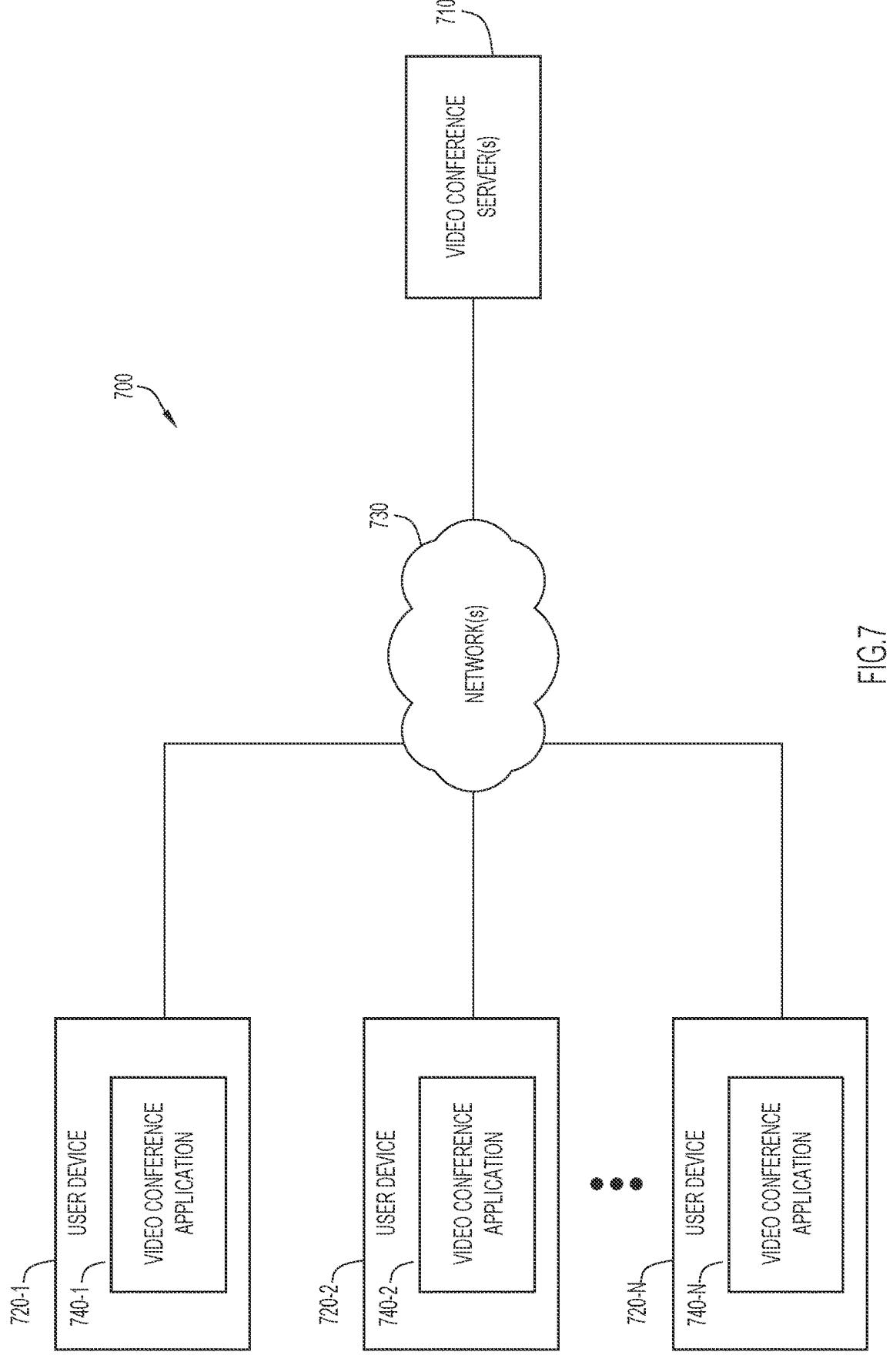
FIG. 7 is a block diagram of a system configured to support stage user replacement for an online video conference, according to various example embodiments presented herein.

Referring to FIG. 7. FIG. 7 is a block diagram of a system 700 in which techniques that facilitate stage user replacement for an online video conference may be implemented, according to an example embodiment. In at least one embodiment, system 700 may include one or more video conference servers 710 and a plurality of user devices 720-1, 720-2, thru 720-N that communicate with the meeting server 710 via network(s) 730. The video conference server(s) 710 are configured to provide a communication session for hosting an online video conference service among user devices 720-1 to 720-N.

The user devices 720-1-720-N may be operated by corresponding participants (not shown) for an online video conference/communication session may each execute a corresponding video conference application 740-1, 740-2, thru 740-N to provide communication to the video conference server(s) 710 and control user participation in an online meeting that is supported by the video conference server(s) 710.

The video conference server(s) 710 and the video conference applications 740-1-740-N for each user device 720-1-720-N are configured to support various stage user replacement techniques as discussed for embodiments herein. Thus, video conference applications 740-1-740-N can include instructions that, when executed, cause processor(s) (not shown) of corresponding user devices 720-1-720-N to perform stage user replacement operations as discussed for embodiments herein.

In various embodiments, user devices 720-1 to 720-N may be any combination of tablets, laptop computers, desktop computers, Smartphones, virtual desktop clients, or any user device now known or hereinafter developed that can run or otherwise execute a video conference client or similar communication functionality. The user devices 720-1 to 720-N may have one or more displays, a dedicated physical keyboard and mouse input/output (I/O) devices and/or touch-screen capabilities to provide a virtual on-screen keyboard to enter text and/or perform one or more user (e.g., selection) interactions in order to support/perform various stage user replacement techniques as discussed for embodiments herein. The user devices 720-1 to 720-N may also include any other hardware, software, operating system, I/O interfaces, processor(s), memory element(s), storage, etc. to facilitate/interface with one or more displays, keyboards, microphones, speakers, etc.

The network(s) 730 may include wired local and wide-area networks as well as wireless local area networks (e.g., Wi-Fi®, etc.) and/or wireless wide area networks (e.g., cellular, etc.). The user devices 720-1 to 720-N may also have short-range wireless system connectivity (such as Bluetooth™ wireless system capability, ultrasound communication capability, etc.) to enable local wireless connectivity with a video conference endpoint or device in a meeting room or with other user devices in the same meeting/ conference room.

Thus, each user device 720-1 to 720-N, as well as video conference server(s) 710, may include corresponding communication I/O interface(s) each of which may include any combination of hardware (e.g., communications units, receiver(s), transmitter(s), antenna(s) and/or antenna array(s), processor(s), memory element(s), baseband processor(s) (modems), etc.), controllers (e.g., wireless local area network controllers, etc.), software, logic, and/or any other elements/logic that may facilitate wireless and/or wired communications and/or connections among one or more elements of system 700.

Referring to FIG. 8, FIG. 8 is a flow chart depicting a method 800 according to an example embodiment. In at least one embodiment, operations associated with method 800 may be implemented, at least in part, by a user device, such as any of user devices 720-1-720-N that may be operated by a particular participant of an online video conference, such as by a stage manipulator (e.g., host, co-host, and/or meeting administrator) for the online video conference and/or video conference server(s) 710. For example, in at least one embodiment at least one of the video conference server(s) 710 and/or video conference applications 740-1-740-N may implement method 800 based on user interactions/information received via one of the user devices 720-1-720-N from a particular participant of an online video conference, such as from a stage manipulator (e.g., host, co-host, and/or meeting administrator) for the online video conference.

At 802, the method 800 involves connecting a plurality of user devices to a communication session in which a plurality of participants of the respective plurality of user devices communicate via the communication session. For example, video conference server(s) 710 may facilitate a communication session for an online video conference among user devices 720-1 to 720-N of participants of the communication session that may be located in different geographical locations over network(s) 730 using video and/or audio. User devices 720-1 to 720-N may display information associated with video conference participants of other user devices 720-1 to 720-N participating in the online video conference and the participants of the online video conference may be able to communicate with the participants/users of other user devices 720-1 to 720-N all at the same time or individually. Each user device 720-1 to 720-N may display information (e.g., video streams, shared content, etc.) associated with the other participants participating in the communication session/online video conference.

At 804, the method involves providing, to the plurality of user devices, a user interface including a stage display area (e.g., stage display area 202 of FIG. 2A) in which at least one participant of the plurality of participants is displayed as at least one current stage user within the stage display area for the communication session and one or more other display areas in which each of the plurality of participants are identified for the communication session (e.g., participant display area 206 and participant list display area 208).

At 806, the method involves providing, to a particular user interface for a particular user device of a particular participant (e.g., provided to the user interface screen of a stage manipulator, such as a host, co-host, or meeting administrator of the online video conference), a management interface element (e.g., stage management interface element 216 (including interface sub-element 216A) of FIG. 2A) that enables the particular participant to manage the at least one current stage user displayed in the stage display area for the communication session.

At 808, the method involves, upon receiving at least one user interaction from the particular participant via the management interface element to select at least one new stage user for the communication session, automatically: replacing the at least one current stage user for the communication session displayed within the stage display area of the particular user device for the particular participant with one or more participants of the plurality of participants that are to be displayed within the stage display area as one or more new stage users for the communication session, as shown at 808-1, and synchronizing the stage display area of the particular user interface of the particular user device of the particular participant including the one or more new stage users to be displayed on other stage display areas of other user interfaces of other participants of the communication session, as shown at 808-2.

In at least one embodiment, receiving the at least one user interaction from the particular participant at 808 may include receiving one selection interaction via the management interface element (e.g., as discussed for FIG. 3A) to automatically select the at least one new stage user based on a stage user list provided for the communication session that identifies, at least in part, an ordered list of participants of the plurality of participants that are to be stage users for the communication session. For example, the one selection interaction may be one mouse selection interaction, or one touch-screen selection interaction received from the particular participant via the management interface element (e.g., as discussed for 302 of FIG. 3A) that causes a next stage user as identified in the stage user list (i.e., that is next in the ordered list following the at least one current stage user) to be selected as the at least one new stage user for the communication session.

In at least one embodiment, the management interface element may be a first management interface element and receiving the at least one user interaction from the particular participant includes receiving a first selection interaction via the first management interface element (e.g., as discussed for 4A with reference to interface sub-element 216A) that causes to be displayed a second management interface element (e.g., stage management pop-up interface 220) identifying an ordered list of participants of the plurality of participants that are to be stage users for the communication session; and receiving at least one second selection interaction via the second management interface element (e.g., via an interface sub-element (such as any of 220-1, 220-2, etc.) of the stage management pop-up interface 220) to select the at least one new stage user.

In at least one embodiment, replacing the at least one current stage user for the communication session displayed within the stage display area of the particular user interface of the particular user device for the particular participant with one or more participants of the plurality of participants that are to be displayed as one or more new stage users within the stage display area of the particular user interface of the particular user device may include: removing from the stage display area of the particular user interface of the particular user device for the particular participant, the at least one current stage user for the communication session; and providing to the stage display area of the particular user interface of the particular user device for the particular participant, the one or more new stage users for the communication session based on a stage user list provided for the communication session that identifies, at least in part, an ordered list of participants of the plurality of participants that are to be stage users for the communication session.

Figure 9:
FIG. 9 is a hardware block diagram of a computing device that may perform functions associated with any combination of operations, in connection with the techniques discussed herein.

Referring to FIG. 9, FIG. 9 illustrates a hardware block diagram of a computing device 900 that may perform functions associated with operations discussed herein. In various embodiments, a computing device or apparatus, such as computing device 900 or any combination of computing devices 900, may be configured as any entity/entities as discussed herein (e.g., user devices 720-1-720-N and video conference server(s) 710) in order to perform operations of the various techniques discussed herein.

In at least one embodiment, computing device 900 may be any apparatus that may include one or more processor(s) 902, one or more memory element(s) 904, storage 906, a bus 908, one or more I/O interface(s) 916, control logic 920 (e.g., calendar logic/scheduling logic, as discussed herein), one or more one network processor unit(s) 930 and one or more network I/O interface(s) 932. In various embodiments, instructions associated with logic for computing device 900 can overlap in any manner and are not limited to the specific allocation of instructions and/or operations described herein.

For embodiments in which computing device 900 may be implemented as any device capable of wireless communications, computing device 900 may further include at least one baseband processor or modem 910, one or more radio RF transceiver(s) 912, one or more antenna(s) or antenna array(s) 914.

In at least one embodiment, processor(s) 902 is/are at least one hardware processor configured to execute various tasks, operations and/or functions for computing device 900 as described herein according to software and/or instructions configured for computing device 900. Processor(s) 902 (e.g., a hardware processor) can execute any type of instructions associated with data to achieve the operations detailed herein. In one example, processor(s) 902 can transform an element or an article (e.g., data, information) from one state or thing to another state or thing. Any of potential processing elements, graphical processing units (GPUs), microprocessors, digital signal processor, baseband signal processor, modem, physical layer (PHY), computing devices, systems, managers, logic, and/or machines described herein can be construed as being encompassed within the broad term 'processor'.

In at least one embodiment, memory element(s) 904 and/or storage 906 is/are configured to store data, information, software, and/or instructions associated with computing device 900, and/or logic configured for memory element(s) 904 and/or storage 906. For example, any logic described herein (e.g., control logic 920) can, in various embodiments, be stored for computing device 900 using any combination of memory element(s) 904 and/or storage 906. Note that in some embodiments, storage 906 can be consolidated with memory element(s) 904 (or vice versa) or can overlap/exist in any other suitable manner.

In at least one embodiment, bus 908 can be configured as an interface that enables one or more elements of computing device 900 to communicate in order to exchange information and/or data. Bus 908 can be implemented with any architecture designed for passing control, data and/or information between processors, memory elements/storage, peripheral devices, and/or any other hardware and/or software components that are configured for computing device 900. In at least one embodiment, bus 908 is implemented as a fast kernel-hosted interconnect, potentially using shared memory between processes (e.g., logic), which can enable efficient communication paths between the processes.

Network processor unit(s) 930 may enable communication between computing device 900 and other systems, devices, or entities, via network I/O interface(s) 932 (wired and/or wireless) to facilitate operations discussed for various embodiments described herein. In various embodiments, network processor unit(s) 930 can be configured as a combination of hardware and/or software, such as one or more Ethernet driver(s) and/or computing device(s) or interface cards, Fibre Channel (e.g., optical) driver(s) and/or computing device(s), wireless receivers/transmitters/transceivers, baseband processor(s)/modem(s), and/or other similar network interface driver(s) and/or computing device(s) now known or hereafter developed to enable communications between computing device 900 and other systems, devices, or entities to facilitate operations for various embodiments described herein. In various embodiments, network I/O interface(s) 932 can be configured as one or more Ethernet port(s), Fibre Channel ports, any other I/O port(s), and/or antenna(s)/antenna array(s) now known or hereafter developed. Thus, the network processor unit(s) 930 and/or network I/O interface(s) 932 may include suitable interfaces for receiving, transmitting, and/or otherwise communicating data and/or information (wired and/or wirelessly) in a network environment.

I/O interface(s) 916 allow for input and output of data and/or information with other entities that are connected to computing device 900. For example, I/O interface(s) 916 may provide a connection to external devices such as a keyboard, keypad, a touch screen, and/or any other suitable input and/or output device now known or hereafter developed. In some instances, external devices can also include portable computer readable (non-transitory) storage media such as database systems, thumb drives, portable optical or magnetic disks, and memory cards. In still some instances, external devices can be a mechanism to display data to a user, such as, for example, a computer monitor, a display screen. In some embodiments, the computing device 900 supports a display having touch-screen display capabilities.

For embodiments in which computing device 900 is implemented as a user device or any other apparatus capable of wireless communications, the RF transceiver(s) 912 may perform RF transmission and RF reception of wireless signals via antenna(s)/antenna array(s) 914, and the baseband processor or modem 910 performs baseband modulation and demodulation, etc. associated with such signals to enable wireless communications for computing device 900.

In various embodiments, control logic 920 (which may include or otherwise be configured to include a video conference application) can include instructions that, when executed, cause processor(s) 902 to perform operations, which can include, but not be limited to, providing overall control operations of computing device 900; interacting with other entities, elements, systems, etc. described herein; maintaining and/or interacting with stored data, information, parameters, etc. (e.g., memory element(s), storage, data structures, databases, tables, etc.); combinations thereof; and/or the like to facilitate various operations for embodiments described herein.

The programs described herein (e.g., control logic 920 of computing device 900) may be identified based upon application(s) for which they are implemented in a specific embodiment. However, it should be appreciated that any particular program nomenclature herein is used merely for convenience; thus, embodiments herein should not be limited to use(s) solely described in any specific application(s) identified and/or implied by such nomenclature.

In various embodiments, any entity or apparatus as described herein may store data/information in any suitable volatile and/or non-volatile memory item (e.g., magnetic hard disk drive, solid state hard drive, semiconductor storage device, random access memory (RAM), read only memory (ROM), erasable programmable read only memory (EPROM), application specific integrated circuit (ASIC), etc.), software, logic (fixed logic, hardware logic, programmable logic, analog logic, digital logic), hardware, and/or in any other suitable component, device, element, and/or object as may be appropriate. Any of the memory items discussed herein should be construed as being encompassed within the broad term 'memory element'. Data/information being tracked and/or sent to one or more entities as discussed herein could be provided in any database, table, and register, list, cache, storage, and/or storage structure: all of which can be referenced at any suitable timeframe. Any such storage options may also be included within the broad term 'memory element' as used herein.

Note that in certain example implementations, operations as set forth herein may be implemented by logic encoded in one or more tangible media that is capable of storing instructions and/or digital information and may be inclusive of non-transitory tangible media and/or non-transitory computer readable storage media (e.g., embedded logic provided in: an ASIC, digital signal processing (DSP) instructions, software [potentially inclusive of object code and source code], etc.) for execution by one or more processor(s), and/or other similar machine, etc. Generally, memory element(s) (e.g., memory element(s) 904 of computing device 900) and/or storage (e.g., storage 906 of computing device 900) can store data, software, code, instructions (e.g., processor instructions), logic, parameters, combinations thereof, and/or the like used for operations described herein. This includes memory element(s) 904 and/or storage 906 being able to store data, software, code, instructions (e.g., processor instructions), logic, parameters, combinations thereof, or the like that are executed to carry out operations in accordance with teachings of the present disclosure.

In some instances, software of the present embodiments may be available via a non-transitory computer useable medium (e.g., magnetic or optical mediums, magneto-optic mediums, CD-ROM, DVD, memory devices, etc.) of a stationary or portable program product apparatus, downloadable file(s), file wrapper(s), object(s), package(s), container(s), and/or the like. In some instances, non-transitory computer readable storage media may also be removable. For example, a removable hard drive may be used for memory/storage in some implementations. Other examples may include optical and magnetic disks, thumb drives, and smart cards that can be inserted and/or otherwise connected to a computing device for transfer onto another computer readable storage medium.

In one form, a computer-implemented method is provided that may include connecting a plurality of user devices to a communication session in which a plurality of participants of the plurality of user devices communicate via the communication session; providing, for each of the plurality of user devices, a user interface including a stage display area in which at least one participant of the plurality of participants is displayed as at least one current stage user within the stage display area for the communication session and one or more other display areas in which each of the plurality of participants are identified for the communication session; providing, to a particular user interface for a particular user device of a particular participant, a management interface element that enables the particular participant to manage the at least one current stage user displayed in the stage display area for the communication session; and upon receiving at least one user interaction from the particular participant via the management interface element to select at least one new stage user for the communication session, automatically: replacing the at least one current stage user for the communication session displayed within the stage display area of the particular user interface of the particular user device for the particular participant with one or more participants of the plurality of participants that are to be displayed as one or more new stage users within the stage display area of the particular user interface of the particular user device; and synchronizing the stage display area of the particular user interface of the particular user device of the particular participant including the one or more new stage users to be displayed on other stage display areas of other user interfaces of other participants of the communication session. The particular participant may be one or more of a host, a co-host, or an administrator of the communication session.

The computer-implemented method may include, providing, for the communication session, a stage user list for the communication session that identifies an ordered list of participants of the plurality of participants that are to be stage users for the communication session. At least one stage user identified in the stage user list may identify a group of stage users including multiple participants of the plurality of participants that are to be displayed within the stage display area for the communication session.

In at least one instance, the stage user list identifies at least one permanent stage user that is to be permanently displayed within the stage display area for the communication session.

In at least one instance, receiving the at least one user interaction from the particular participant includes receiving one selection interaction via the management interface element to automatically select the at least one new stage user based on a stage user list provided for the communication session that identifies, at least in part, an ordered list of participants of the plurality of participants that are to be stage users for the communication session. In at least one instance, the one selection interaction is one mouse selection interaction, or one touch-screen selection interaction received from the particular participant via the management interface element that causes a next stage user as identified in the stage user list to be selected as the at least one new stage user for the communication session.

In at least one instance, the management interface element is a first management interface element and receiving the at least one user interaction from the particular participant includes: receiving a first selection interaction via the first management interface element that causes to be displayed a second management interface element identifying an ordered list of participants of the plurality of participants that are to be stage users for the communication session; and receiving at least one second selection interaction via the second management interface element to select the at least one new stage user.

In at least one instance, replacing the at least one current stage user for the communication session displayed within the stage display area of the particular user interface of the particular user device for the particular participant with one or more participants of the plurality of participants that are to be displayed as one or more new stage users within the stage display area of the particular user interface of the particular user device includes: removing from the stage display area of the particular user interface of the particular user device for the particular participant, the at least one current stage user for the communication session; and providing to the stage display area of the particular user interface of the particular user device for the particular participant, the one or more new stage users for the communication session based on a stage user list provided for the communication session that identifies, at least in part, an ordered list of participants of the plurality of participants that are to be stage users for the communication session.

In one form, another computer-implemented method is provided that may include providing, to a particular user interface for a particular user device of a particular participant of a plurality of participants for a communication session, a management interface element that enables the particular participant to manage the at least one current stage user displayed in the stage display area for the communication session; and upon receiving at least one user interaction from the particular participant via the management interface element to select at least one new stage user for the communication session, automatically: replacing the at least one current stage user for the communication session displayed within the stage display area of the particular user interface of the particular user device for the particular participant with one or more participants of the plurality of participants that are to be displayed as one or more new stage users within the stage display area of the particular user interface of the particular user device; and synchronizing the stage display area of the particular user interface of the particular user device of the particular participant including the one or more new stage users to be displayed on other stage display areas of other user interfaces of other participants of the communication session.

Variations and Implementations

Embodiments described herein may include one or more networks, which can represent a series of points and/or network elements of interconnected communication paths for receiving and/or transmitting messages (e.g., packets of information) that propagate through the one or more networks. These network elements offer communicative interfaces that facilitate communications between the network elements. A network can include any number of hardware and/or software elements coupled to (and in communication with) each other through a communication medium. Such networks can include, but are not limited to, any local area network (LAN), virtual LAN (VLAN), wide area network (WAN) (e.g., the Internet), software defined WAN (SD-WAN), wireless local area (WLA) access network, wireless wide area (WWA) access network, metropolitan area network (MAN), Intranet, Extranet, virtual private network (VPN), Low Power Network (LPN), Low Power Wide Area Network (LPWAN), Machine to Machine (M2M) network, Internet of Things (IoT) network, Ethernet network/switching system, any other appropriate architecture and/or system that facilitates communications in a network environment, and/or any suitable combination thereof.

Networks through which communications propagate can use any suitable technologies for communications including wireless communications (e.g., 4G/5G/nG, IEEE 802.11 (e.g., Wi-Fi®/Wi-Fi6®), IEEE 802.16 (e.g., Worldwide Interoperability for Microwave Access (WiMAX)), Radio-Frequency Identification (RFID), Near Field Communication (NFC), Bluetooth™, mm.wave, Ultra-Wideband (UWB), etc.), and/or wired communications (e.g., T1 lines, T3 lines, digital subscriber lines (DSL), Ethernet, Fibre Channel, etc.). Generally, any suitable means of communications may be used such as electric, sound, light, infrared, and/or radio to facilitate communications through one or more networks in accordance with embodiments herein. Communications, interactions, operations, etc. as discussed for various embodiments described herein may be performed among entities that may directly or indirectly connected utilizing any algorithms, communication protocols, interfaces, etc. (proprietary and/or non-proprietary) that allow for the exchange of data and/or information.

In various example implementations, any entity or apparatus for various embodiments described herein can encompass network elements (which can include virtualized network elements, functions, etc.) such as, for example, network appliances, forwarders, routers, servers, switches, gateways, bridges, load balancers, firewalls, processors, modules, radio receivers/transmitters, and/or any other suitable device, component, element, or object operable to exchange information that facilitates or otherwise helps to facilitate various operations in a network environment as described for various embodiments herein. Note that with the examples provided herein, interaction may be described in terms of one, two, three, or four entities. However, this has been done for purposes of clarity, simplicity and example only. The examples provided should not limit the scope or inhibit the broad teachings of systems, networks, etc. described herein as potentially applied to a myriad of other architectures.

Communications in a network environment can be referred to herein as 'messages', 'messaging', 'signaling', 'data', 'content', 'objects', 'requests', 'queries', 'responses', 'replies', etc. which may be inclusive of packets. As referred to herein and in the claims, the term 'packet' may be used in a generic sense to include packets, frames, segments, datagrams, and/or any other generic units that may be used to transmit communications in a network environment. Generally, a packet is a formatted unit of data that can contain control or routing information (e.g., source and destination address, source and destination port, etc.) and data, which is also sometimes referred to as a 'payload', 'data payload', and variations thereof. In some embodiments, control or routing information, management information, or the like can be included in packet fields, such as within header(s) and/or trailer(s) of packets. Internet Protocol (IP) addresses discussed herein and, in the claims, can include any IP version 4 (IPv4) and/or IP version 6 (IPv6) addresses.

To the extent that embodiments presented herein relate to the storage of data, the embodiments may employ any number of any conventional or other databases, data stores or storage structures (e.g., files, databases, data structures, data or other repositories, etc.) to store information.

Note that in this Specification, references to various features (e.g., elements, structures, nodes, modules, components, engines, logic, steps, operations, functions, characteristics, etc.) included in 'one embodiment', 'example embodiment', 'an embodiment', 'another embodiment', 'certain embodiments', 'some embodiments', 'various embodiments', 'other embodiments', 'alternative embodiment', and the like are intended to mean that any such features are included in one or more embodiments of the present disclosure, but may or may not necessarily be combined in the same embodiments. Note also that a module, engine, client, controller, function, logic or the like as used herein in this Specification, can be inclusive of an executable file comprising instructions that can be understood and processed on a server, computer, processor, machine, compute node, combinations thereof, or the like and may further include library modules loaded during execution, object files, system files, hardware logic, software logic, or any other executable modules.

It is also noted that the operations and steps described with reference to the preceding figures illustrate only some of the possible scenarios that may be executed by one or more entities discussed herein. Some of these operations may be deleted or removed where appropriate, or these steps may be modified or changed considerably without departing from the scope of the presented concepts. In addition, the timing and sequence of these operations may be altered considerably and still achieve the results taught in this disclosure. The preceding operational flows have been offered for purposes of example and discussion. Substantial flexibility is provided by the embodiments in that any suitable arrangements, chronologies, configurations, and timing mechanisms may be provided without departing from the teachings of the discussed concepts.

As used herein, unless expressly stated to the contrary, use of the phrase 'at least one of', 'one or more of', 'and/or', variations thereof, or the like are open-ended expressions that are both conjunctive and disjunctive in operation for any and all possible combination of the associated listed items. For example, each of the expressions 'at least one of X, Y and Z', 'at least one of X, Y or Z', 'one or more of X, Y and Z', 'one or more of X. Y or Z' and 'X, Y and/or Z' can mean any of the following: 1) X, but not Y and not Z; 2) Y, but not X and not Z; 3) Z, but not X and not Y; 4) X and Y, but not Z; 5) X and Z, but not Y; 6) Y and Z, but not X; or 7) X, Y, and Z.

Additionally, unless expressly stated to the contrary, the terms 'first', 'second', 'third', etc., are intended to distinguish the particular nouns they modify (e.g., element, condition, node, module, activity, operation, etc.). Unless expressly stated to the contrary, the use of these terms is not intended to indicate any type of order, rank, importance, temporal sequence, or hierarchy of the modified noun. For example, 'first X' and 'second X' are intended to designate two 'X' elements that are not necessarily limited by any order, rank, importance, temporal sequence, or hierarchy of the two elements. Further as referred to herein, 'at least one of' and 'one or more of can be represented using the' (s)' nomenclature (e.g., one or more element(s)).

Each example embodiment disclosed herein has been included to present one or more different features. However, all disclosed example embodiments are designed to work together as part of a single larger system or method. This disclosure explicitly envisions compound embodiments that combine multiple previously discussed features in different example embodiments into a single system or method.

One or more advantages described herein are not meant to suggest that any one of the embodiments described herein necessarily provides all of the described advantages or that all the embodiments of the present disclosure necessarily provide any one of the described advantages. Numerous other changes, substitutions, variations, alterations, and/or modifications may be ascertained to one skilled in the art and it is intended that the present disclosure encompass all such changes, substitutions, variations, alterations, and/or modifications as falling within the scope of the appended claims.

What is claimed is:

1. A computer-implemented method comprising:

connecting a plurality of user devices to a communication session in which a plurality of participants of the plurality of user devices communicate via the communication session;

providing, for each of the plurality of user devices, a user interface including a stage display area in which at least one participant of the plurality of participants is displayed as at least one current stage user within the stage display area for the communication session and one or more other display areas in which each of the plurality of participants are identified for the communication session;

providing, to a particular user interface for a particular user device of a particular participant, a management interface element that enables the particular participant to manage the at least one current stage user displayed in the stage display area for the communication session; and upon receiving one user interaction from the particular participant via the management interface element to select at least one new stage user for the communication session, automatically performing both of:

replacing the at least one current stage user for the communication session displayed within the stage display area of the particular user interface of the particular user device for the particular participant with one or more participants of the plurality of participants that are to be displayed as one or more new stage users within the stage display area of the particular user interface of the particular user device; and synchronizing the stage display area of the particular user interface of the particular user device of the particular participant including the one or more new stage users to be displayed on other stage display areas of other user interfaces of other participants of the communication session.

2. The computer-implemented method of claim 1, further comprising:

providing a stage user list for the communication session that identifies an ordered list of participants of the plurality of participants that are to be stage users for the communication session.

3. The computer-implemented method of claim 2, wherein at least one stage user identified in the stage user list identifies a group of stage users including multiple participants of the plurality of participants that are to be displayed within the stage display area for the communication session.

4. The computer-implemented method of claim 2, wherein the stage user list identifies at least one permanent stage user that is to be permanently displayed within the stage display area for the communication session.

5. The computer-implemented method of claim 1, wherein receiving the one user interaction from the particular participant includes receiving one selection interaction via the management interface element to automatically select the at least one new stage user based on a stage user list provided for the communication session that identifies, at least in part, an ordered list of participants of the plurality of participants that are to be stage users for the communication session.

6. The computer-implemented method of claim 5, wherein the one selection interaction is one mouse selection interaction or one touch-screen selection interaction received from the particular participant via the management interface element that causes a next stage user as identified in the stage user list to be selected as the at least one new stage user for the communication session.

7. The computer-implemented method of claim 1, wherein the management interface element is a first management interface element and receiving the one user interaction from the particular participant includes:

receiving a first selection interaction via the first management interface element that causes to be displayed a second management interface element identifying an ordered list of participants of the plurality of participants that are to be stage users for the communication session; and receiving at least one second selection interaction via the second management interface element to select the at least one new stage user.

8. The computer-implemented method of claim 1, wherein replacing the at least one current stage user for the communication session displayed within the stage display area of the particular user interface of the particular user device for the particular participant with one or more participants of the plurality of participants that are to be displayed as one or more new stage users within the stage display area of the particular user interface of the particular user device includes:

removing from the stage display area of the particular user interface of the particular user device for the particular participant, the at least one current stage user for the communication session; and providing to the stage display area of the particular user interface of the particular user device for the particular participant, the one or more new stage users for the communication session based on a stage user list provided for the communication session that identifies, at least in part, an ordered list of participants of the plurality of participants that are to be stage users for the communication session.

9. The computer-implemented method of claim 1, wherein the particular participant is a host, a co-host, or an administrator of the communication session.

10. One or more non-transitory computer readable storage media encoded with instructions that, when executed by a processor, cause the processor to perform operations, comprising:

connecting a plurality of user devices to a communication session in which a plurality of participants of the plurality of user devices communicate via the communication session;

providing, for each of the plurality of user devices, a user interface including a stage display area in which at least one participant of the plurality of participants is displayed as at least one current stage user within the stage display area for the communication session and one or more other display areas in which each of the plurality of participants are identified for the communication session;

providing, to a particular user interface for a particular user device of a particular participant, a management interface element that enables the particular participant to manage the at least one current stage user displayed in the stage display area for the communication session; and upon receiving one user interaction from the particular participant via the management interface element to select at least one new stage user for the communication session, automatically performing both of:

replacing the at least one current stage user for the communication session displayed within the stage display area of the particular user interface of the particular user device for the particular participant with one or more participants of the plurality of participants that are to be displayed as one or more new stage users within the stage display area of the particular user interface of the particular user device; and synchronizing the stage display area of the particular user interface of the particular user device of the particular participant including the one or more new stage users to be displayed on other stage display areas of other user interfaces of other participants of the communication session.

11. The media of claim 10, wherein receiving the one user interaction from the particular participant includes receiving one selection interaction via the management interface element to automatically select the at least one new stage user based on a stage user list provided for the communication session that identifies, at least in part, an ordered list of participants of the plurality of participants that are to be stage users for the communication session.

12. The media of claim 11, wherein the one selection interaction is one mouse selection interaction or one touch-screen selection interaction received from the particular participant via the management interface element that causes a next stage user as identified in the stage user list to be selected as the at least one new stage user for the communication session.

13. The media of claim 10, wherein the management interface element is a first management interface element and receiving the one user interaction from the particular participant includes:

receiving a first selection interaction via the first management interface element that causes to be displayed a second management interface element identifying an ordered list of participants of the plurality of participants that are to be stage users for the communication session; and receiving at least one second selection interaction via the second management interface element to select the at least one new stage user.

14. The media of claim 10, wherein replacing the at least one current stage user for the communication session displayed within the stage display area of the particular user interface of the particular user device for the particular participant with one or more participants of the plurality of participants that are to be displayed as one or more new stage users within the stage display area of the particular user interface of the particular user device includes:

removing from the stage display area of the particular user interface of the particular user device for the particular participant, the at least one current stage user for the communication session; and providing to the stage display area of the particular user interface of the particular user device for the particular participant, the one or more new stage users for the communication session based on a stage user list provided for the communication session that identifies, at least in part, an ordered list of participants of the plurality of participants that are to be stage users for the communication session.

15. A system comprising:

at least one memory element for storing data; and at least one processor for executing instructions associated with the data, wherein executing the instructions causes the system to perform operations, comprising:

connecting a plurality of user devices to a communication session in which a plurality of participants of the plurality of user devices communicate via the communication session;

providing, for each of the plurality of user devices, a user interface including a stage display area in which at least one participant of the plurality of participants is displayed as at least one current stage user within the stage display area for the communication session and one or more other display areas in which each of the plurality of participants are identified for the communication session;

providing, to a particular user interface for a particular user device of a particular participant, a management interface element that enables the particular participant to manage the at least one current stage user displayed in the stage display area for the communication session; and upon receiving one user interaction from the particular participant via the management interface element to select at least one new stage user for the communication session, automatically performing both of:

replacing the at least one current stage user for the communication session displayed within the stage display area of the particular user interface of the particular user device for the particular participant with one or more participants of the plurality of participants that are to be displayed as one or more new stage users within the stage display area of the particular user interface of the particular user device; and synchronizing the stage display area of the particular user interface of the particular user device of the particular participant including the one or more new stage users to be displayed on other stage display areas of other user interfaces of other participants of the communication session.

16. The system of claim 15, wherein receiving the one user interaction from the particular participant includes receiving one selection interaction via the management interface element to automatically select the at least one new stage user based on a stage user list provided for the communication session that identifies, at least in part, an ordered list of participants of the plurality of participants that are to be stage users for the communication session.

17. The system of claim 16, wherein the one selection interaction is one mouse selection interaction or one touchscreen selection interaction received from the particular participant via the management interface element that causes a next stage user as identified in the stage user list to be selected as the at least one new stage user for the communication session.

18. The system of claim 15, wherein the management interface element is a first management interface element and receiving the one user interaction from the particular participant includes:

receiving a first selection interaction via the first management interface element that causes to be displayed a second management interface element identifying an ordered list of participants of the plurality of participants that are to be stage users for the communication session; and receiving at least one second selection interaction via the second management interface element to select the at least one new stage user.

19. The system of claim 15, wherein replacing the at least one current stage user for the communication session displayed within the stage display area of the particular user interface of the particular user device for the particular participant with one or more participants of the plurality of participants that are to be displayed as one or more new stage users within the stage display area of the particular user interface of the particular user device includes:

removing from the stage display area of the particular user interface of the particular user device for the particular participant, the at least one current stage user for the communication session; and providing to the stage display area of the particular user interface of the particular user device for the particular participant, the one or more new stage users for the communication session based on a stage user list provided for the communication session that identifies, at least in part, an ordered list of participants of the plurality of participants that are to be stage users for the communication session.

20. The system of claim 15, wherein executing the instructions causes the system to perform operations, comprising:

providing a stage user list for the communication session that identifies an ordered list of participants of the plurality of participants that are to be stage users for the communication session.

* * * * *